United States Patent
Ng et al.

(10) Patent No.: US 12,260,232 B1
(45) Date of Patent: Mar. 25, 2025

(54) SYSTEMS AND METHODS FOR CUSTOMIZING A GRAPHICAL USER INTERFACE WITH USER-ASSOCIATED DISPLAY SETTINGS

(71) Applicant: Hearth Display Inc., Brooklyn, NY (US)

(72) Inventors: Lianne Mei Lin Ng, Brooklyn, NY (US); Marie-Natalie Mansueti, Brooklyn, NY (US); Susan Rene Typher Harrison, Denver, CO (US); Renee Zonghsin Chang, Brooklyn, NY (US)

(73) Assignee: Hearth Display Inc., Brooklyn, NY (US)

( * ) Notice: Subject to any disclaimer, the term of this patent is extended or adjusted under 35 U.S.C. 154(b) by 0 days.

(21) Appl. No.: 18/891,969

(22) Filed: Sep. 20, 2024

(51) Int. Cl.
*G06F 9/451* (2018.01)
*G06F 3/0488* (2022.01)

(52) U.S. Cl.
CPC ............ *G06F 9/451* (2018.02); *G06F 3/0488* (2013.01)

(58) Field of Classification Search
CPC ................................ G06F 9/451; G06F 3/0488
USPC ....................................................... 715/745
See application file for complete search history.

(56) References Cited

U.S. PATENT DOCUMENTS

| | | | | |
|---|---|---|---|---|
| 8,441,962 B1 * | 5/2013 | Breau | ................. | H04L 65/1104 370/266 |
| 8,996,432 B1 * | 3/2015 | Fu | ......................... | G06N 20/00 706/11 |
| 9,531,862 B1 * | 12/2016 | Vadodaria | ............... | H04L 51/02 |
| 9,936,161 B1 * | 4/2018 | Noland | ................... | H04N 7/147 |
| 10,182,766 B2 * | 1/2019 | Fu | ............................ | A61B 5/11 |
| 10,684,758 B2 * | 6/2020 | Hinckley | .............. | G06F 3/0482 |
| 2002/0101349 A1 * | 8/2002 | Rojas, Jr. | ............... | G08B 5/222 340/539.12 |
| 2004/0193449 A1 * | 9/2004 | Wildman | ............... | G16H 40/67 705/2 |
| 2005/0099493 A1 * | 5/2005 | Chew | ................. | H04N 21/4788 348/E7.083 |
| 2009/0074164 A1 * | 3/2009 | Cansler | ................. | H04M 1/576 379/88.13 |
| 2012/0194439 A1 * | 8/2012 | Noris | ..................... | G06F 3/0219 345/172 |
| 2013/0337907 A1 * | 12/2013 | Kojo | ..................... | A63F 13/847 463/29 |
| 2014/0051506 A1 * | 2/2014 | Ameling | ................ | G06Q 99/00 463/29 |

(Continued)

*Primary Examiner* — William D Titcomb
(74) *Attorney, Agent, or Firm* — Morrison & Foerster LLP

(57) ABSTRACT

A method for adapting a shared organization device for different users of a plurality of users includes: identifying a first user of the plurality of users associated with the shared organization device that is interacting with the shared organization device based on a first user input; determining one or more user-associated display settings for the first user based on a physical ability and a cognitive ability of the first user; displaying an interactive user interface of the shared organization device based on the one or more user-associated display settings for the first user, comprising: displaying one or more interactive affordances at a first location of the touch screen display based on the physical ability of the first user, and displaying one or more symbolic representations of one or more tasks assigned to the first user based on the cognitive ability of the first user.

22 Claims, 8 Drawing Sheets

(56) References Cited

U.S. PATENT DOCUMENTS

| | | | |
|---|---|---|---|
| 2015/0328550 A1* | 11/2015 | Herzig | A63F 13/60 |
| | | | 463/31 |
| 2016/0089606 A1* | 3/2016 | Javed Lal Mohammed | |
| | | Ameerjan | A63F 13/30 |
| | | | 463/29 |
| 2016/0162179 A1* | 6/2016 | Annett | G06F 3/011 |
| | | | 715/709 |
| 2016/0198319 A1* | 7/2016 | Huang | G06F 1/1694 |
| | | | 455/412.2 |
| 2018/0336524 A1* | 11/2018 | Van Os | H04M 1/72436 |
| 2019/0018506 A1* | 1/2019 | Bernstein | G06F 3/0482 |
| 2019/0052637 A1* | 2/2019 | Dean | H04W 12/04 |
| 2019/0200872 A1* | 7/2019 | Matsuoka | G08B 21/0202 |
| 2019/0369861 A1* | 12/2019 | Ive | G06F 3/04883 |
| 2019/0372345 A1* | 12/2019 | Bain | G06Q 30/0601 |
| 2020/0301575 A1* | 9/2020 | Lindholm | H04N 21/4821 |
| 2020/0341610 A1* | 10/2020 | Quintana | G06F 3/04855 |
| 2021/0091971 A1* | 3/2021 | Keohane | H04L 12/2829 |
| 2021/0132750 A1* | 5/2021 | Paiva | H04L 51/04 |
| 2021/0240332 A1* | 8/2021 | Walkin | G06F 3/0489 |
| 2021/0349627 A1* | 11/2021 | Chang | G06F 3/0488 |
| 2021/0373749 A1* | 12/2021 | Fullerton | G06F 3/04842 |
| 2022/0334669 A1* | 10/2022 | Sanders | G06F 3/04842 |
| 2022/0365831 A1* | 11/2022 | Weskamp | G06F 9/546 |
| 2024/0004532 A1* | 1/2024 | Soli | G06F 3/04842 |
| 2024/0264719 A1* | 8/2024 | Weil | G06Q 10/10 |
| 2024/0273793 A1* | 8/2024 | DeCharms | G09B 5/06 |

* cited by examiner

500

502 Identifying a first user of the plurality of users associated with the shared organization device that is interacting with the shared organization device based on a first user input

504 Determining one or more user-associated display settings for the first user based on a physical ability and a cognitive ability of the first user

506 Displaying an interactive user interface of the shared organization device based on the one or more user-associated display settings for the first user, comprising: displaying one or more interactive affordances at a first location of the touch screen display based on the physical ability of the first user, and displaying one or more symbolic representations of one or more tasks assigned to the first user based on the cognitive ability of the first user

508 Identifying a second user of the plurality of users associated with the shared organization device that is interacting with the shared organization device based on a second user input

510 Determining one or more user-associated display settings for the second user based on a physical ability and a cognitive ability of the second user

512 Displaying an interactive user interface of the shared organization device based on the one or more user-associated display settings for the second user, comprising: displaying one or more interactive affordances at a second location of the touch screen display based on the physical ability of the second user, and displaying one or more textual representations of one or more tasks assigned to the second user based on the cognitive ability of the second user 5

SYSTEMS AND METHODS FOR CUSTOMIZING A GRAPHICAL USER INTERFACE WITH USER-ASSOCIATED DISPLAY SETTINGS

FIELD

The present disclosure relates generally to graphical user interfaces and more specifically to systems and methods for providing customized graphical user interface (GUI) experiences for different users.

BACKGROUND

Conventional organizational devices include paper calendars, to-do lists, routines, etc. More recently, tools such as digital calendars, project management software, and other tools have been developed to enable individuals to organize their tasks electronically. However, features provided by such tools are not tailored to the groups using them. Thus, such tools lack customized and adaptable user interfaces that are optimized for the group associated with the tool, and for individuals included in that group.

SUMMARY

Disclosed herein are systems, devices, and methods for adapting graphical user interfaces (GUIs) of shared organization devices to different users in a group, such as a family, group of caregivers, group of coworkers, etc., associated with the device. An exemplary shared organization device may recognize different users within a group that are interacting with the device and may adapt a GUI based on characteristics of the different users. The device may arrange affordances and information on the interface based on physical abilities of the user interacting with the device to provide an ergonomic experience for the user. The device may also "translate" information for users of different cognitive abilities such that the users can better understand and interact with the information conveyed through the interface.

For example, relatively older users may have more advanced reading skills than relatively younger users. Language may be translated into visuals (e.g., symbolic icons) for relatively younger users to facilitate their interactions with the device. Similarly, younger users may not be tall enough to interact with affordances on some locations (e.g., the top) of the GUI. Objects and affordances for younger users may be displayed relatively lower on the GUI than for older users. The shared organization device may also be able to directly detect physical characteristics of the users (e.g., using a camera and object detection/recognition software), enabling the device to automatically determine physical abilities of users in real time based on detected characteristics, rather than, for instance, using age as a proxy. Thus, the shared organization devices disclosed herein may be configured to enable individual users to interact with a GUI in different user-associated display modes based on display settings tailored to their ability to interact with the shared organization device.

According to an aspect, an exemplary method for adapting a shared organization device for different users of a plurality of users comprises: identifying a first user of the plurality of users associated with the shared organization device that is interacting with the shared organization device based on a first user input; determining one or more user-associated display settings for the first user based on a physical ability and a cognitive ability of the first user; displaying an interactive user interface of the shared organization device based on the one or more user-associated display settings for the first user, comprising: displaying one or more interactive affordances at a first location of the touch screen display based on the physical ability of the first user, and displaying one or more symbolic representations of one or more tasks assigned to the first user based on the cognitive ability of the first user; identifying a second user of the plurality of users associated with the shared organization device that is interacting with the shared organization device based on a second user input; determining one or more user-associated display settings for the second user based on a physical ability and a cognitive ability of the second user; displaying an interactive user interface of the shared organization device based on the one or more user-associated display settings for the second user, comprising: displaying one or more interactive affordances at a second location of the touch screen display based on the physical ability of the second user, and displaying one or more textual representations of one or more tasks assigned to the second user based on the cognitive ability of the second user.

Optionally, the method includes receiving activity data associated with the first user based on a selection of an interactive affordance of the one or more interactive affordances by the first user; updating a database associated with the shared organization device based on the activity data associated with the first user, comprising updating a status of a task associated with the selected interactive affordance; and updating the interactive user interface to display an interactive affordance indicating the updated status of the task.

Optionally, the method includes receiving activity data associated with the second user based on a selection of an interactive affordance of the one or more interactive affordances by the second user; updating the database associated with the shared organization device based on the activity data associated with the second user, comprising updating a status of a task associated with the selected interactive affordance; and updating the interactive user interface to display an interactive affordance indicating the updated status of the task.

Optionally, the method includes determining at least one behavioral insight associated with the first user based on the updated database, comprising comparing the activity data associated with the first user users to activity data associated with at least one other user of the plurality of users.

Optionally, the method includes displaying the at least one behavioral insight.

Optionally, the method includes displaying an interactive shared calendar interface comprising a plurality of tasks associated with the first user and the second user based on the updated database.

Optionally, updating the interactive user interface comprises updating a progress bar displayed on the interactive interface based on the updated status of the task.

Optionally, the physical ability of the first user is determined based on a physical characteristic of the first user detected using a camera of the shared organization device, and wherein the physical ability of the second user is determined based on a physical characteristic of the second user detected using a camera of the shared organization device.

Optionally, the cognitive ability of the first user is determined based on an age of the first user stored in a database associated with the shared organization device, and the cognitive ability of the second user is determined based on an age of the second user stored in a database associated with the shared organization device.

Optionally, displaying the interactive user interface of the shared organization device based on the one or more user-associated display settings for the first user comprises displaying one or more simplified interactive affordances based on the physical ability of the first user; and wherein displaying the interactive user interface of the shared organization device based on the one or more user-associated display settings for the second user comprises displaying one or more advanced interactive affordances based on the physical ability of the second user.

Optionally, the first user input comprises an identifier associated with the first user received via the interactive interface of the shared organization device, and wherein the second user input comprises an identifier associated with the second user received via the interactive interface of the shared organization device.

Optionally, first user input comprises biometric data associated with the first user detected using a sensor of the shared organization device, and wherein the second user input comprises biometric data associated with the second user detected using the sensor of the shared organization device.

Optionally, determining the one or more user-associated display settings of the user comprises querying a database to determine the one or more user-associated display settings stored in association with the user.

Optionally, the database is stored in a memory of the device.

According to an aspect, an exemplary shared organization device comprises: a touch-screen display; one or more processors; and memory storing instructions that, when executed by the one or more processors, cause the shared organization device to: identify a first user of the plurality of users associated with the shared organization device that is interacting with the shared organization device based on a first user input; determine one or more user-associated display settings for the first user based on a physical ability and a cognitive ability of the first user; display an interactive user interface of the shared organization device based on the one or more user-associated display settings for the first user, comprising: displaying one or more interactive affordances at a first location of the touch screen display based on the physical ability of the first user, and displaying one or more symbolic representations of one or more tasks assigned to the first user based on the cognitive ability of the first user; identify a second user of the plurality of users associated with the shared organization device that is interacting with the shared organization device based on a second user input; determine one or more user-associated display settings for the second user based on a physical ability and a cognitive ability of the second user; display an interactive user interface of the shared organization device based on the one or more user-associated display settings for the second user, comprising: displaying one or more interactive affordances at a second location of the touch screen display based on the physical ability of the second user, and displaying one or more textual representations of one or more tasks assigned to the second user based on the cognitive ability of the second user.

Optionally, the shared organization device is configured to wirelessly communicate with a plurality of wireless devices.

Optionally, the shared organization device comprises at least one sensor configured to detect biometric data.

Optionally, the at least one sensor comprises a camera.

Optionally, the shared organization device is configured to identify the first user based on an input received via a sensor of the device.

Optionally, the shared organization device is configured to identify the first user based on an input received via the graphical user interface.

Optionally, the instructions, when executed by the one or more processors, cause the shared organization device to: receive activity data associated with the first user based on a selection of an interactive affordance of the one or more interactive affordances by the first user; update a database associated with the shared organization device based on the activity data associated with the first user, comprising updating a status of a task associated with the selected interactive affordance; and update the interactive user interface to display an interactive affordance indicating the updated status of the task.

Optionally, the instructions, when executed by the one or more processors, cause the shared organization device to: receive activity data associated with the second user based on a selection of an interactive affordance of the one or more interactive affordances by the second user; update the database associated with the shared organization device based on the activity data associated with the second user, comprising updating a status of a task associated with the selected interactive affordance; and update the interactive user interface to display an interactive affordance indicating the updated status of the task.

Optionally, the instructions, when executed by the one or more processors, cause the shared organization device to: determine at least one behavioral insight associated with the first user based on the updated database, comprising comparing the activity data associated with the first user users to activity data associated with at least one other user of the plurality of users.

Optionally, the instructions, when executed by the one or more processors, cause the shared organization device to: display the at least one behavioral insight.

Optionally, the instructions, when executed by the one or more processors, cause the shared organization device to: display an interactive shared calendar interface comprising a plurality of tasks associated with the first user and the second user based on the updated database.

Optionally, updating the interactive user interface comprises updating a progress bar displayed on the interactive interface based on the updated status of the task.

Optionally, the physical ability of the first user is determined based on a physical characteristic of the first user detected using a camera of the shared organization device, and wherein the physical ability of the second user is determined based on a physical characteristic of the second user detected using a camera of the shared organization device.

Optionally, the cognitive ability of the first user is determined based on an age of the first user stored in a database associated with the shared organization device, and the cognitive ability of the second user is determined based on an age of the second user stored in a database associated with the shared organization device.

Optionally, displaying the interactive user interface of the shared organization device based on the one or more user-associated display settings for the first user comprises displaying one or more simplified interactive affordances based on the physical ability of the first user; and wherein displaying the interactive user interface of the shared organization device based on the one or more user-associated display settings for the second user comprises displaying one or more advanced interactive affordances based on the physical ability of the second user.

Optionally, the first user input comprises an identifier associated with the first user received via the interactive interface of the shared organization device, and wherein the second user input comprises an identifier associated with the second user received via the interactive interface of the shared organization device.

Optionally, first user input comprises biometric data associated with the first user detected using a sensor of the shared organization device, and wherein the second user input comprises biometric data associated with the second user detected using the sensor of the shared organization device.

Optionally, determining the one or more user-associated display settings of the user comprises querying a database to determine the one or more user-associated display settings stored in association with the user.

Optionally, the database is stored in a memory of the device.

According to an aspect, an exemplary system for adapting a shared organization device for different users of a plurality of users comprises one or more processors and memory storing instructions that, when executed by the one or more processors, cause the system to: identify a first user of the plurality of users associated with the shared organization device that is interacting with the shared organization device based on a first user input; determine one or more user-associated display settings for the first user based on a physical ability and a cognitive ability of the first user; display an interactive user interface of the shared organization device based on the one or more user-associated display settings for the first user, comprising: displaying one or more interactive affordances at a first location of the touch screen display based on the physical ability of the first user, and displaying one or more symbolic representations of one or more tasks assigned to the first user based on the cognitive ability of the first user; identify a second user of the plurality of users associated with the shared organization device that is interacting with the shared organization device based on a second user input; determine one or more user-associated display settings for the second user based on a physical ability and a cognitive ability of the second user; display an interactive user interface of the shared organization device based on the one or more user-associated display settings for the second user, comprising: displaying one or more interactive affordances at a second location of the touch screen display based on the physical ability of the second user, and displaying one or more textual representations of one or more tasks assigned to the second user based on the cognitive ability of the second user.

Optionally, the instructions, when executed by the one or more processors, cause the system to: receive activity data associated with the first user based on a selection of an interactive affordance of the one or more interactive affordances by the first user; update a database associated with the shared organization device based on the activity data associated with the first user, comprising updating a status of a task associated with the selected interactive affordance; and update the interactive user interface to display an interactive affordance indicating the updated status of the task.

Optionally, the instructions, when executed by the one or more processors, cause the system to: receive activity data associated with the second user based on a selection of an interactive affordance of the one or more interactive affordances by the second user; update the database associated with the shared organization device based on the activity data associated with the second user, comprising updating a status of a task associated with the selected interactive affordance; and update the interactive user interface to display an interactive affordance indicating the updated status of the task.

Optionally, the instructions, when executed by the one or more processors, cause the system to: determine at least one behavioral insight associated with the first user based on the updated database, comprising comparing the activity data associated with the first user users to activity data associated with at least one other user of the plurality of users.

Optionally, the instructions, when executed by the one or more processors, cause the system to: display the at least one behavioral insight.

Optionally, the instructions, when executed by the one or more processors, cause the system to: display an interactive shared calendar interface comprising a plurality of tasks associated with the first user and the second user based on the updated database.

Optionally, updating the interactive user interface comprises updating a progress bar displayed on the interactive interface based on the updated status of the task.

Optionally, the physical ability of the first user is determined based on a physical characteristic of the first user detected using a camera of the shared organization device, and wherein the physical ability of the second user is determined based on a physical characteristic of the second user detected using a camera of the shared organization device.

Optionally, the cognitive ability of the first user is determined based on an age of the first user stored in a database associated with the shared organization device, and the cognitive ability of the second user is determined based on an age of the second user stored in a database associated with the shared organization device.

Optionally, displaying the interactive user interface of the shared organization device based on the one or more user-associated display settings for the first user comprises displaying one or more simplified interactive affordances based on the physical ability of the first user; and wherein displaying the interactive user interface of the shared organization device based on the one or more user-associated display settings for the second user comprises displaying one or more advanced interactive affordances based on the physical ability of the second user.

Optionally, the first user input comprises an identifier associated with the first user received via the interactive interface of the shared organization device, and wherein the second user input comprises an identifier associated with the second user received via the interactive interface of the shared organization device.

Optionally, first user input comprises biometric data associated with the first user detected using a sensor of the shared organization device, and wherein the second user input comprises biometric data associated with the second user detected using the sensor of the shared organization device.

Optionally, determining the one or more user-associated display settings of the user comprises querying a database to determine the one or more user-associated display settings stored in association with the user.

Optionally, the database is stored in a memory of the device.

According to an aspect, an exemplary non-transitory computer-readable storage medium stores instructions for adapting a shared organization device for different users of a plurality of users, wherein the instructions are executable by a system comprising one or more processors to cause the system to: identify a first user of the plurality of users associated with the shared organization device that is interacting with the shared organization device based on a first user input; determine one or more user-associated display settings for the first user based on a physical ability and a cognitive ability of the first user; display an interactive user interface of the shared organization device based on the one or more user-associated display settings for the first user, comprising: displaying one or more interactive affordances at a first location of the touch screen display based on the physical ability of the first user, and displaying one or more symbolic representations of one or more tasks assigned to the first user based on the cognitive ability of the first user; identify a second user of the plurality of users associated with the shared organization device that is interacting with the shared organization device based on a second user input; determine one or more user-associated display settings for the second user based on a physical ability and a cognitive ability of the second user; display an interactive user interface of the shared organization device based on the one or more user-associated display settings for the second user, comprising: displaying one or more interactive affordances at a second location of the touch screen display based on the physical ability of the second user, and displaying one or more textual representations of one or more tasks assigned to the second user based on the cognitive ability of the second user.

In some examples, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

A better understanding of the features and advantages of the present disclosure will be obtained by reference to the following detailed description that sets forth illustrative examples, in which the principles of the disclosure are utilized, and the accompanying drawings of which:

FIG. 5 illustrates an exemplary method for adapting a GUI to individual users included in a group of users, in accordance with some examples.

DETAILED DESCRIPTION

Figure 1:
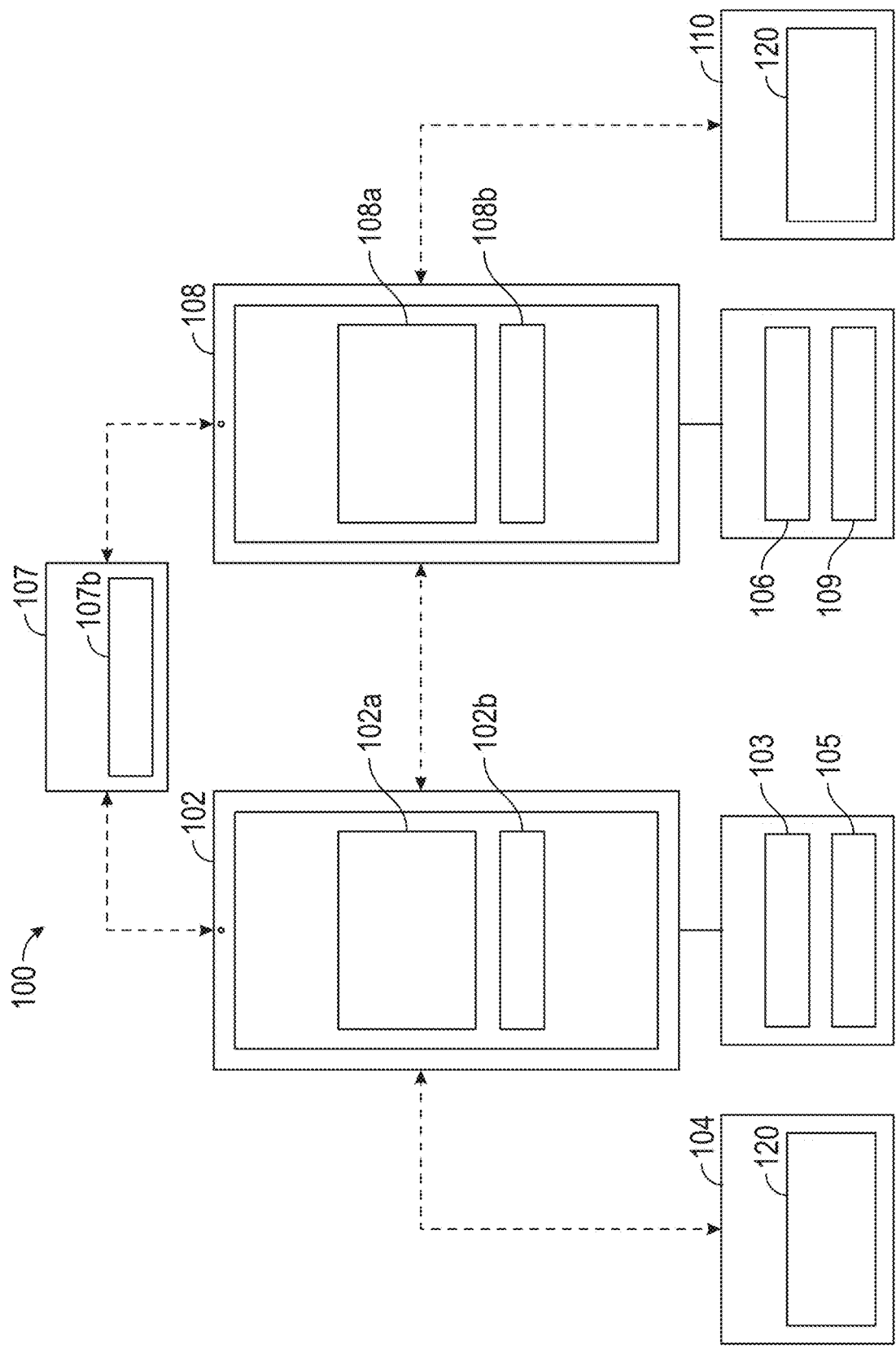
FIG. 1 illustrates an exemplary system that includes one or more shared organization devices configured to adapt interactive user interfaces to individual users included in a group of users associated with a respective shared organization device, in accordance with some examples.

Disclosed herein are systems, devices, and methods for displaying graphical user interfaces (GUIs) that are adapted to individual users in a group associated with a shared organization device. The shared organization devices disclosed herein can be associated with a group of users, store data about the group and individuals included therein, and configure GUIs that are optimized for characteristics of the users in the group. The shared organization devices disclosed herein may be configured to recognize which user in a group is interacting with the device and optimize various GUI features for that particular user. For instance, the device may detect an input and identify a user interacting with the device based on the input. The input may be received via the GUI (e.g., a username, password), detected via a sensor provided on the device (e.g., a biometric identifier such as a fingerprint, voice identification, facial recognition), or other input capable of identifying the respective user.

The device may determine user-associated display settings based on characteristics of the user interacting with the device. The characteristics of the user may be stored in a database associated with the device and may be indicative of a user's ability to interact with different aspects of the GUI displayed on the shared organization device. For instance, the shared organization device may determine a cognitive ability and a physical ability of the user interacting with the device. Cognitive ability may include, for instance, reading ability, language fluency, attentional ability (e.g., neurodivergency), decision making, pattern recognition, etc., Cognitive ability may be associated with a user's age, literacy or cognitive processing level, disability status, etc., any one or more of which may be stored in association with the user in the database. Physical ability may include, for example, touch literacy, gesture ability, ability to reach different portions of the device display, sight, hearing, etc. Physical ability may be associated with a user's age, height, disability status, etc.

The device may determine the cognitive ability and/or physical ability of a user by querying a database associated with the device using the identifier associated with the user. In some examples, the device may additionally, or alternatively, determine physical abilities of a respective user based on detected characteristics of the user. For instance, the device may detect a height of a user using a camera of the device. The shared organization device may then tailor the information and affordances displayed on the GUI according to the characteristics of the identified user. Display settings may be stored in association with different cognitive and/or physical abilities of a user in the database and/or may be determined algorithmically for each user based on the user's physical and/or cognitive abilities. For instance, symbolic representations may be used in place of text for users of low reading ability. For users with relatively low touch literacy (e.g., younger users) affordances may be placed lower on the screen, a number of affordances may be reduced, and a manner in which the affordances enable a user to interact with the GUI may be simplified (e.g., check boxes in place of swiping) to enable the user to provide accurate inputs to the device.

The user-associated display settings for a given user may be dynamic (e.g., the settings may change over time) based on changes to user characteristics such as age, height, etc., which may result in changes to physical and/or cognitive ability. In some examples, characteristics of the users may be automatically or manually updated in the database over time, resulting in automatic changes to user-associated display settings (e.g., based on changing age, height, etc.). Some user characteristics, such as height, may be detected using sensors (e.g., cameras) of the shared devices and stored in association with the users in the database(s). Some user characteristics may be updated based on user inputs (e.g., received via the GUI and/or via a mobile application of a wireless device configured to interact with the shared organization device). Thus, the user interfaces disclosed herein can adapt in response to changes in the characteristics of users of the shared devices over time, providing a seamlessly optimized user experience.

It should be understood that users and groups of users may be associated with multiple shared organization devices (e.g., a family may have two or more in their home). Information associated with the users/group may be stored in a databased accessible by each of the devices (and/or a copy of the database may be stored at each device associated with the group). The respective devices may access the database and activate features (e.g., user-specific GUI features) independently of the other devices associated with the group. For instance, a first shared organization device may adapt its GUI to a first user of a group while another shared organization device may adapt its GUI to a second user of the group based on information stored in the database (or copies thereof) and accessible by the devices. This may be useful, for instance, when a family owns multiple shared organization devices and different users access two devices at the same time (e.g., in different rooms of the house).

In the following description of the various examples, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an exemplary system 100 that includes one or more shared organization devices 102 and/or 108 configured to optimize interactive user interfaces for individual users included in a group of users associated with a respective shared organization device (e.g., shared organization device 102). As shown, shared organization device 102 is associated with Group 1, which includes users 103 and 105 and shared organization device 108 is associated with Group 2, which includes users 106 and 109. It should be understood that a group associated with any of the shared organization devices of system 100 may include any number of users. Moreover, while the description provided below primarily references shared organization device 102, any of the functionality and features described with respect to shared organization device 102, its associated database(s) 102*b*, and/or GUI 102*a* may be equally applicable to shared organization device 108, its associated database(s) 108*b*, and/or GUI 108*a*, and/or any of the other shared organization devices included in the exemplary system 100. Further, the system may include any number of shared organization devices and each group of users may be associated with one or more shared organization devices. The shared organization devices 102 and/or 108 may be configured to be mounted on a wall to enable a plurality of users included in a group of users associated with the shared organization device to easily interact with a GUI displayed on the device. For example, shared organization device 102 may be configured such that it can be mounted on a wall of a living room, office space, or other room in which defined groups of individuals (e.g., families, work teams, etc.) may congregate.

The shared organization device 102 may be an organizational tool configured to display a GUI 102*a* that includes interactive capabilities for task assignment, calendaring, project and routine scheduling, etc., tailored to the group associated with the device (group 1) and individuals therein (user 103 and 105). Shared organization device 102 may be configured to tailor the GUI 102*a* to respective users included in group 1 according to user associated display settings that may be stored in user profiles associated with each user in group 1. For instance, the shared organization device 102 be configured to operate in user-associated display modes in which the GUI 102a is configured according to display settings based on the user that is interacting with the device. In a user-associated display mode, the GUI 102a may be configured to display information relevant to the user interacting with the device and may configure various features (e.g., interactive affordances, information conveyed through the GUI) based on characteristics of the user, such as a cognitive ability and/or physical ability of the user interacting with the device.

Shared organization device 102 may identify a user interacting with the device based on one or more user inputs. In some examples, shared organization device 102 may identify the user by querying a database (e.g., database 102b) to compare the user input (e.g., a username) with user data stored within the database. The user input may include an input received via the interactive user interface (GUI 102a) of shared organization device 102 such as a username, password, email, or other authenticating information. The user input may additionally or alternatively include biometric data such as facial recognition data, fingerprint data, etc. detected using a sensor of shared organization device 102. The shared organization device 102 may determine one or more characteristics of the identified user. For instance, one or more characteristics of the identified user may be stored in association with the user in the database (e.g., database 102b). The characteristics of the user may include a cognitive ability of the user and a physical ability of the user. The cognitive ability of the user may be based on any of an age of the first user, a language fluency of the first user, a literacy of the first user, a literacy or cognitive processing level of the first user, executive functioning of the first user, or any combination thereof. The physical ability of the user may be based on any of an age of the user, a height of the first user, a gesture ability of the first user, a mobility status of the first user, an eyesight status of the first user, a hearing ability of the first user, or any combination thereof.

The shared organization device 102 may determine one or more user-associated display settings for the identified user based on the one or more characteristics of the user and may display an interactive user interface of the shared organization device based on the one or more user-associated display settings for the identified user. For example, shared organization device 102 may display one or more interactive affordances at a first location of the GUI 102a for users of a first level or type of physical ability and may display one or more interactive affordances at a second location of the GUI 102a for users of a second level or type of physical ability. Physical ability levels or types may be based at least in part on a user's height. The first location may thus be at a lower position (e.g., closer to the bottom) on the GUI 102a while the second location may be at a relatively higher location (e.g., closer to the top) of the GUI 102a. Physical ability may include, for instance, touch literacy. Touch literacy may include, for instance, the ability to perform single finger gestures, such as the ability to tap in a specified area e.g. for navigation, or swipe on a specified area, the ability to perform dragging and dropping of GUI components into particular areas of the GUI, the ability to use two fingers to pinch or zoom, etc. Shared organization device 102 may display relatively fewer interactive affordances for users of a first touch literacy and relatively more interactive affordances for users of a second touch literacy. GUI 102a may display relatively larger touch areas to users of lower touch literacy and relatively smaller touch areas to users with higher touch literacy. Relatively younger users may be presented with fewer affordances (and/or fewer objects, less information) on a single screen of GUI 102a to avoid overwhelming the user with information. For instance, shared organization device 102 may display a single task of a relatively younger user's routine on GUI 102a and shared organization device 102 may display a relatively older user's entire routine comprising a plurality of tasks on GUI 102a. It should be understood that one or more of the aspects of GUI 102a tailored to users of different physical abilities (e.g., different touch literacy) may also be tailored to users of different cognitive ability. For instance, GUI 102a may present users of lower attentional ability with fewer tasks on a screen of the GUI 102a than users of higher attentional ability, etc.

It should also be understood that display settings for particular users may evolve over time, for instance, as users get older, grow taller, become more physically or cognitively capable of interacting with different device features, etc. Such changes in characteristics of different users may be determined automatically based on interactions with the device received from users, based on detected characteristics of users, based on characteristics input by the users, and/or based on incremental updates to characteristics such as age applied automatically by the shared organization device. For instance, the device may detect a user has become more adept at interacting with the GUI based on decreased latencies between prompts issued by the device and corresponding responsive inputs from the user and/or based on successful execution of relatively more complex gestures by the user(s). The device may detect changes in characteristics of the users using one or more sensors of the device, such as changes in height based on an image of the user received from a camera of the shared organization device. The device may update characteristics of users algorithmically over time, for instance, by automatically updating a user's age over time. The device may also update characteristics of different users based on characteristics input by the users themselves (e.g., an age input in response to a prompt issued via the GUI).

Shared organization device 102 may display text (e.g., words, sentences, etc.) to users having a relatively higher degree of cognitive ability (which may include reading ability/literacy). Shared organization device 102 may display symbolic representations of the text (e.g., icons, graphics, etc.) to users having a relatively lower degree of cognitive ability. It should be understood that these examples are not meant to be limiting. Shared organization device 102 may configure the interactive affordances and objects of GUI 102a in any number of ways to optimize the GUI 102a for the identified user.

Shared organization device 102 may be configured to enable users to track completion of tasks, routines, projects, or other activities by recording such completions via the GUI of the device. The shared organization device 102 may also be configured to determine individual and group behavioral insights associated with the completion of such activities, enabling a group of users, and individuals therein, associated with device 102 to track their performance, for instance relative to one another and/or to other groups associated with different shared organization devices. Shared organization device 102 may also be configured to generate recommendations, for instance, shared organization device 102 may recommend specific users for various task assignments and/or recommend rewards for completing various tasks to incentivize improved performance (e.g., more efficient completion of assigned tasks, etc.).

The shared organization device 102 may be configured to read from, write to, and/or display data from one or more associated databases (e.g., database 102b stored locally at device 102 and/or 107b stored remotely at server 107). For instance, shared organization device 102 may configure GUI 102a to display data stored in database 102b associated with tasks, routines, or other activities assigned and/or completed by the group (Group 1) and/or individuals in the group (users 103 and/or 105). In some examples, a user of shared organization device 102 may see data associated with tasks, routines, or other activities assigned to and/or completed by any user in Group 1. In a some examples, a user of shared organization device 102 may see only data associated with tasks, routines, or other activities assigned to and/or completed by the particular user accessing the device (e.g., user 103).

Any of databases 102b, 108b, and/or 107b may store data associated with a group of users (e.g., Group 1 and/or Group 2) associated with device 102 and/or device 108, data associated with individual users included in the group of users (e.g., users 103, 105, 106, and/or 109), and/or data associated with tasks, routines, or other activities assigned to and/or completed by a group and/or individuals in the group. Databases 102b, 108b, and/or 107b may include user profiles and/or group profiles that store information associated with particular users and/or groups associated with the different shared organization devices. In some examples, one or more databases may be stored in a memory of the shared organization device. For instance, each shared organization device 102 and/or 108 may include respective database(s) 102b and 108b. In some examples, one or more databases 107b may be stored remotely at server 107 (e.g., on the cloud). Data associated with either or both Group 1 and Group 2, and/or individual users included in Group 1 and Group 2, may be stored in any of databases 102b, 108b, and/or 107b. Shared organization device 102 may configure GUI 102a to display data in a format according to a particular user's personalized display settings stored in one or more of databases. For example, a user with a first height may have personalized display settings that cause a particular interactive affordance to be displayed at a first location on shared organization device 102, while a user with a second lower height may have personalized display settings that cause the particular interactive affordance to be displayed at a second lower location on shared organization device 102.

A user of shared organization device 102 may interact with GUI 102a to track the completion status of tasks assigned to and/or completed by the respective user or a group of users associated with the device. A user may interact with an interactive affordance of GUI 102a to signify the completion of a task. Based at least in part on user inputs received via GUI 102a, device 102 may update data associated with the task stored in one or more of the databases 102b, 108b, and/or 107b to indicate the task's completion. Based on the interactions with shared organization device 102 indicative of the updated status (e.g., completion) of various tasks and the data stored in database(s) 102b and/or 107b, device 102 may be configured to determine individual and group behavioral insights associated with updated status of such tasks.

Shared organization device 102 may enable a group of users (e.g., Group 1), and individuals therein (e.g., users 103 and 105), associated with the shared organization device 102 to track their performance (e.g., a completion percentage for their assigned tasks, routines, etc.) relative to other users.

Shared organization device 102 may determine and track behavioral insights for one or more individual users in Group 1 and compare behavioral insights between different users in the group (e.g., user 103 and 105) to determine comparative metrics between different users in the group. For instance, shared organization device 102 may determine the user in Group 1 that is most efficient for particular tasks and/or the user in Group 1 that is least efficient for particular tasks. Thus, device 102 may track performance of individuals in the associated group (Group 1) relative to one another. Device 102 may also determine comparative metrics between Group 1 and other groups of individuals associated with different shared organization devices, such as Group 2 associated with shared organization device 108. Device 102 may determine which of Group 1 and Group 2 are most efficient with respect to particular tasks and/or most efficient week in a particular time period (e.g., week-to-week, month-to-month, year-to-year). Device 102 may determine which of Group 1 and Group 2 more evenly distributes tasks among the users in each of the respective groups, which of Group 1 and Group 2 has improved its respective task-completion efficiency more within a given time period, which of Group 1 and Group 2 has more consistently adopted behavior change recommendations generated by the respective shared organization device (device 102 or 108), etc. As described below, device 108 may similarly determine comparative metrics between groups and/or the server 107 may determine comparative metrics between groups and transmit the metrics to the shared organization devices.

Shared organization device 102 may also be configured to generate recommendations. The recommendations may be generated by shared organization device 102 based on behavioral insights. Recommendations generated by shared organization device 102 may include a recommended assignment of a particular task for one or more users included in the group of users, a recommended reward associated with a particular task of the plurality of tasks, a recommended routine comprising a sequence of tasks, a recommended addition to an existing routine of a user in the group of users, and/or a recommended time to complete a particular task of the plurality of tasks. For instance, shared organization device 102 may recommend specific users (e.g., 103 or 105) for various task assignments and/or recommended rewards for completing various tasks to incentivize performance.

The shared organization devices described herein (e.g., shared organization device 102) may be configured to wirelessly communicate with one or more other shared organization devices (e.g., shared organization device 108). The shared organization devices may communicate with one another using any wired or wireless communication protocol. For instance, the shared organization devices may communicate with one another via Bluetooth or WiFi, Local Area Network, Wide Area Network, via server 107, and/or any other method of wired or wireless electronic communications. The shared organization devices 102 and 108 may communicate, for instance, to compare group and individual performance metrics (e.g., between Group 1 and Group 2). In some examples, shared organization devices 102 and/or 108 may wirelessly communicate with server 107 (e.g., to provide copies of group and individual data to the server 107 and/or database 107b stored remotely the server 107 rather than sharing the data between the devices). In some examples, one or more analyses (e.g., behavioral insight analyses) may be performed at server 107 and transmitted back to the shared organization device(s) 102 and/or 108. In some examples, shared organization devices 102 and/or 108 may determine group and individual performance metrics and/or behavioral insights and share anonymized data (e.g., anonymized performance metrics) with server 107 for comparison with anonymized data from shared organization devices associated with different groups. Sharing data between the shared organization devices 102 and 108 and/or server 107 enables comparison of behavioral insights between groups associated with different devices (e.g., Group 1 and Group 2).

Figure 7:
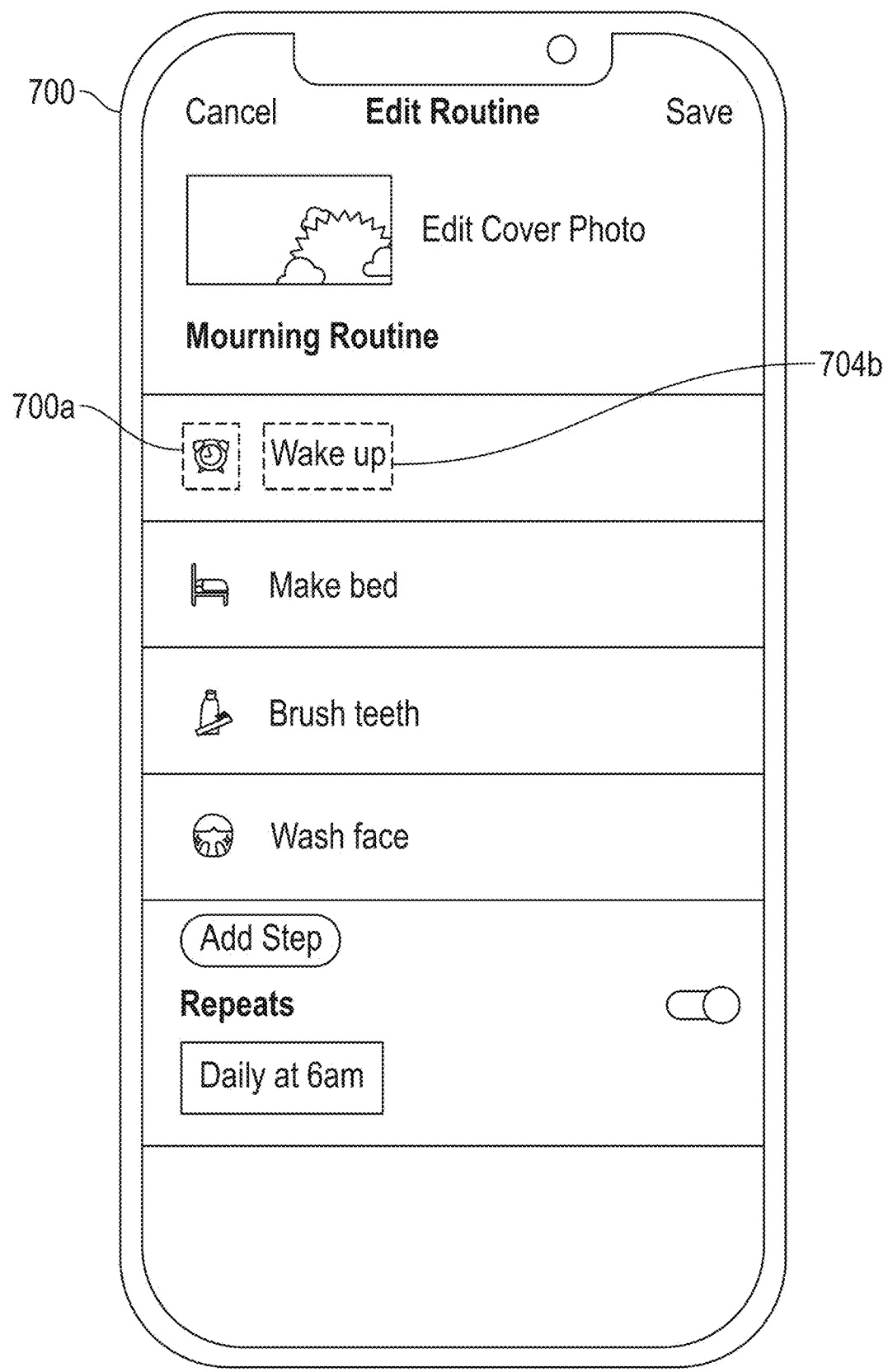
FIG. 7 illustrates a GUI for mobile device used to interact with a shared organization device, in accordance with some examples.

Shared organization device(s) 102 and/or 108 may be configured to wirelessly communicate with a custom mobile application 120 via one or more wireless devices 104 and/or 110 to enable wireless user interaction with the shared organization device 102 and/or 108. For instance, the custom mobile application 120 may enable a user, such as user 105 in Group 1, to edit and view data associated with their user profile and/or the group profile (e.g., view a personal and/or shared calendar, manage personal routines, complete group tasks, etc.). The custom mobile application 120, via wireless device 104, may transmit data (e.g., indicating completion of a task, edited routine, etc.) to the associated shared organization device 102 and/or 108 and/or server 107 to update the database 102b, 107b, and/or 108b associated with the shared organization device 102 and/or 108. FIG. 7 illustrates an exemplary mobile application 700 that could be used to interact with a shared organization device. Mobile application 700 may include any of the features described above with reference to mobile application 120. In some examples, a user using mobile application 700 may view one or more interactive affordances, where each interactive affordance is associated with a particular task. In some examples, the interactive affordances associated with a particular task may be displayed using text-based expressions 704b and/or symbolic expressions 704a. Mobile application 700 may enable a user to interact with various features of the shared organization devices disclosed herein.

Figure 2:
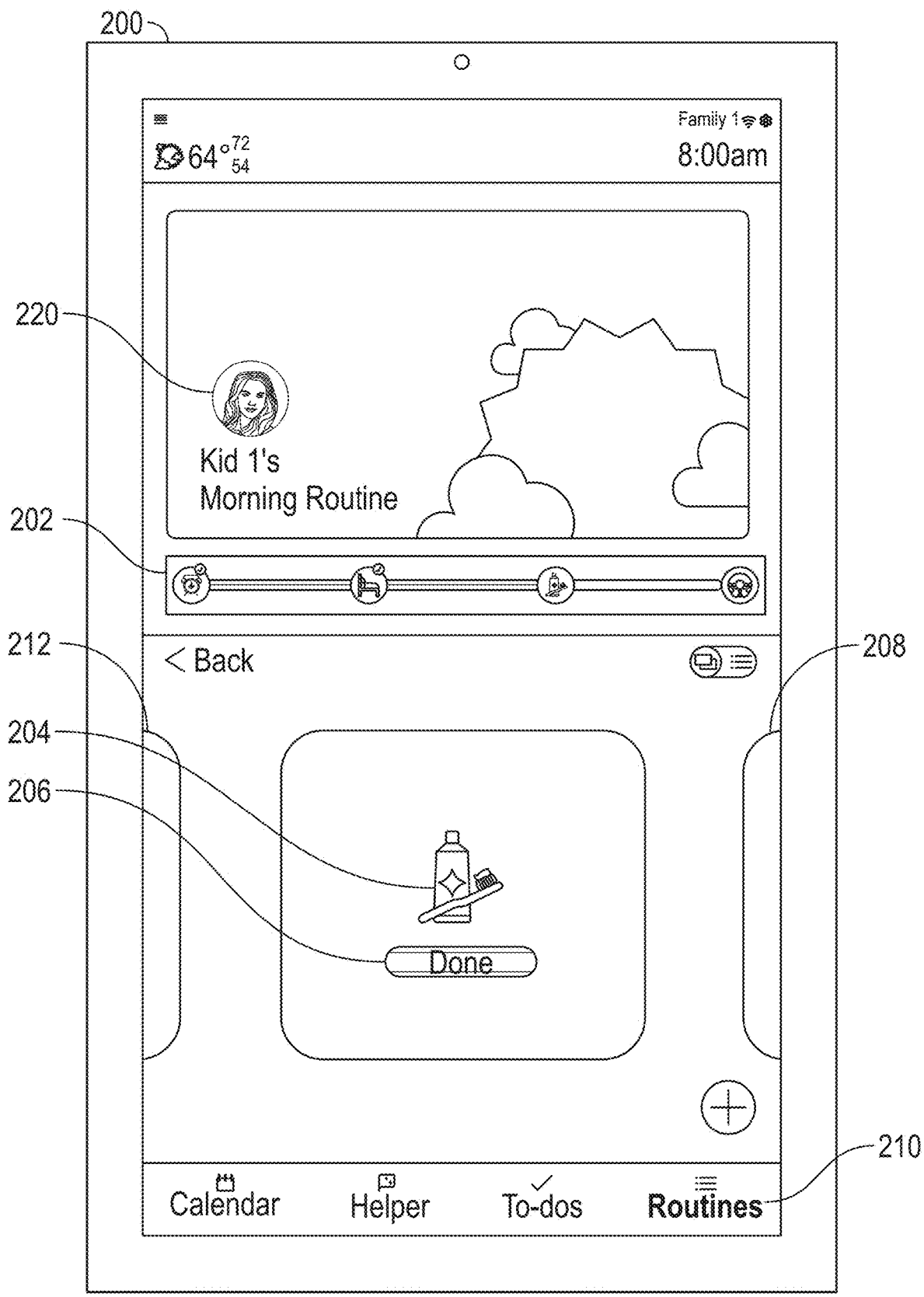
FIG. 2 illustrates a GUI in a first user-associated display mode associated with a first user, in accordance with some examples.

Various features of system 100, described above, and methods 500 and 600, described below, are illustrated in the exemplary graphical user interfaces depicted in FIGS. 2-4. FIG. 2 illustrates an exemplary GUI 200 that may be associated with a first user (e.g., user 103 of Group 1), labeled "Kid 1" in the figure. GUI 200 may be displayed on a touch screen display of the shared organization devices described herein (e.g., shared organization device 102).

GUI 200 depicts an exemplary interface that displays a routine for the first user 220 (e.g., user 103 of Group 1), which may be accessible via a routines affordance 210. The routines affordance 210, when selected, may enable the user 220 to navigate to their routine when they are logged into the device (e.g., via an identifier/biometric as described throughout). GUI 200 includes an object 204 that may be indicative of a task assigned to the first user. GUI 200 also includes an interactive affordance 206 associated with the object 204. The task may be part of a sequence of tasks that forms the first user 220's routing. The first user may navigate to another task of their routine by swiping on the screen to access object 208, which may be associated with the next task in the routine or swiping in the opposite direction to access object 212, which may be associated with the previous task in the routine. The object 204 in FIG. 2 depicts a toothbrush and toothpaste. Object 204 may thus indicate that the first user 220 has been assigned a task to brush their teeth. Affordance 204 may be configured such that when it is selected by a user, the device updates a database to indicate that the task associated with the affordance 206 and/or object 204 is complete. The GUI 200 also includes a progress bar 202. As the first user 220 marks tasks as completed, the progress bar may update to indicate a task included in the user's routine has been completed.

Figure 6:
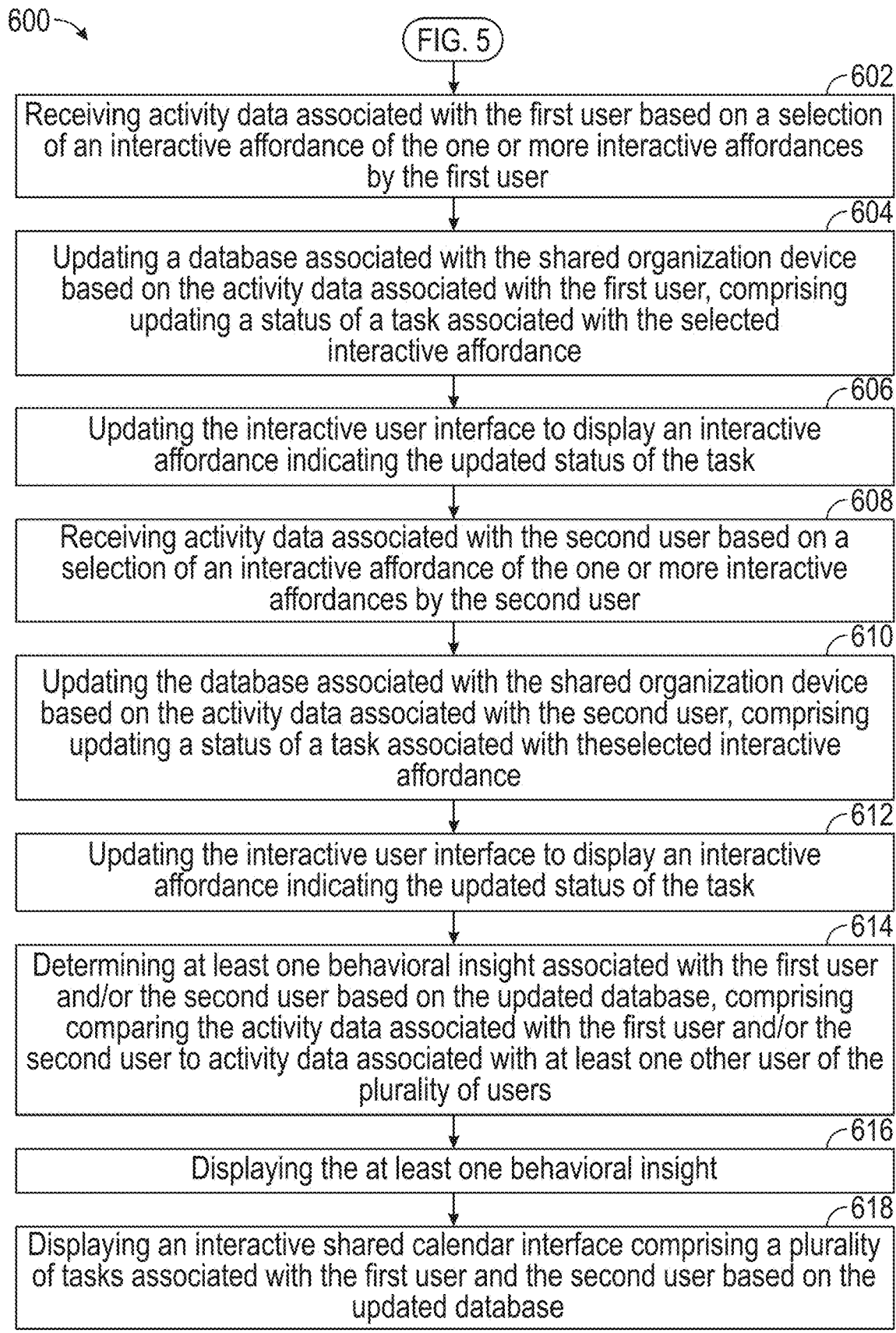
FIG. 6 illustrates an exemplary continuation of the method of FIG. 5, that includes generating behavioral insights and displaying shared calendars, in accordance with some examples.

The objects (e.g., 204, 202, 208, 212) and affordances (e.g., 206, 210) displayed on GUI 200 may be displayed based on user-associated display settings for the first user 220. One or more of the objects and/or affordances of GUI 200 may be displayed based on physical abilities (e.g., height, age) and/or cognitive abilities (e.g., literacy, age) of the first user 220. For instance, relative to a second user's routine page (depicted in FIG. 3) the first user 220's routine page may be relatively simpler, including minimal text (most of the text being replaced with symbolic representations) and relatively fewer interactive affordances. As an example, object 202 is an example of an object included for executive functioning purposes, configured to help users predict and feel less anxious about what the next step/amount of steps required are in their schedule, routing, etc. The first user 220 may be younger than the second user (e.g., user 320), and thus may be less physically and mentally capable of interacting with a more complex GUI (as shown in FIG. 6, discussed below, the second user's routine page includes additional affordances and additional text describing their routing). Accordingly, the first user's GUI 200 is adapted to their physical and cognitive abilities.

Figure 3:
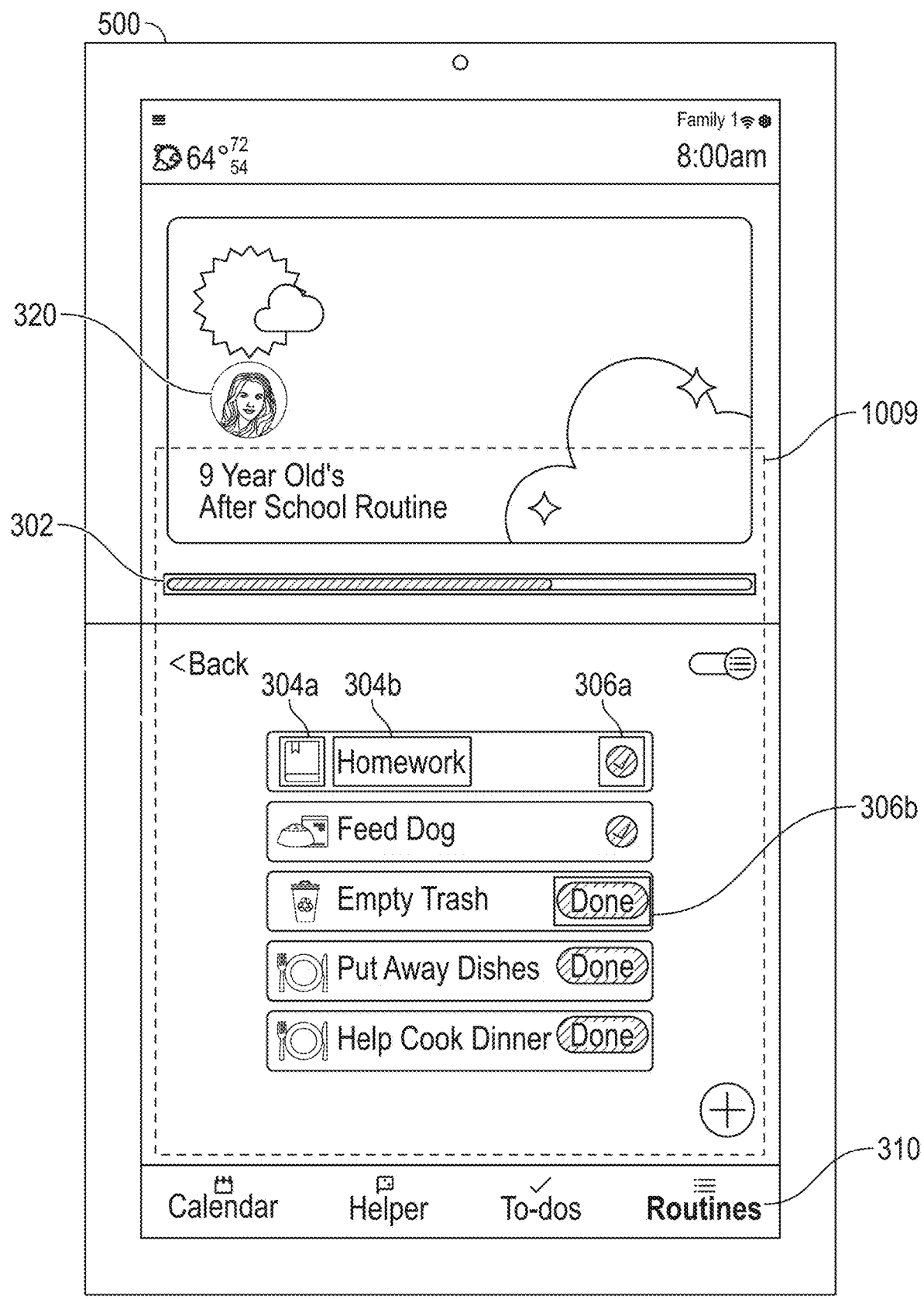
FIG. 3 illustrates a GUI in a second user-associated display mode associated with a second user, in accordance with some examples.
Figure 4:
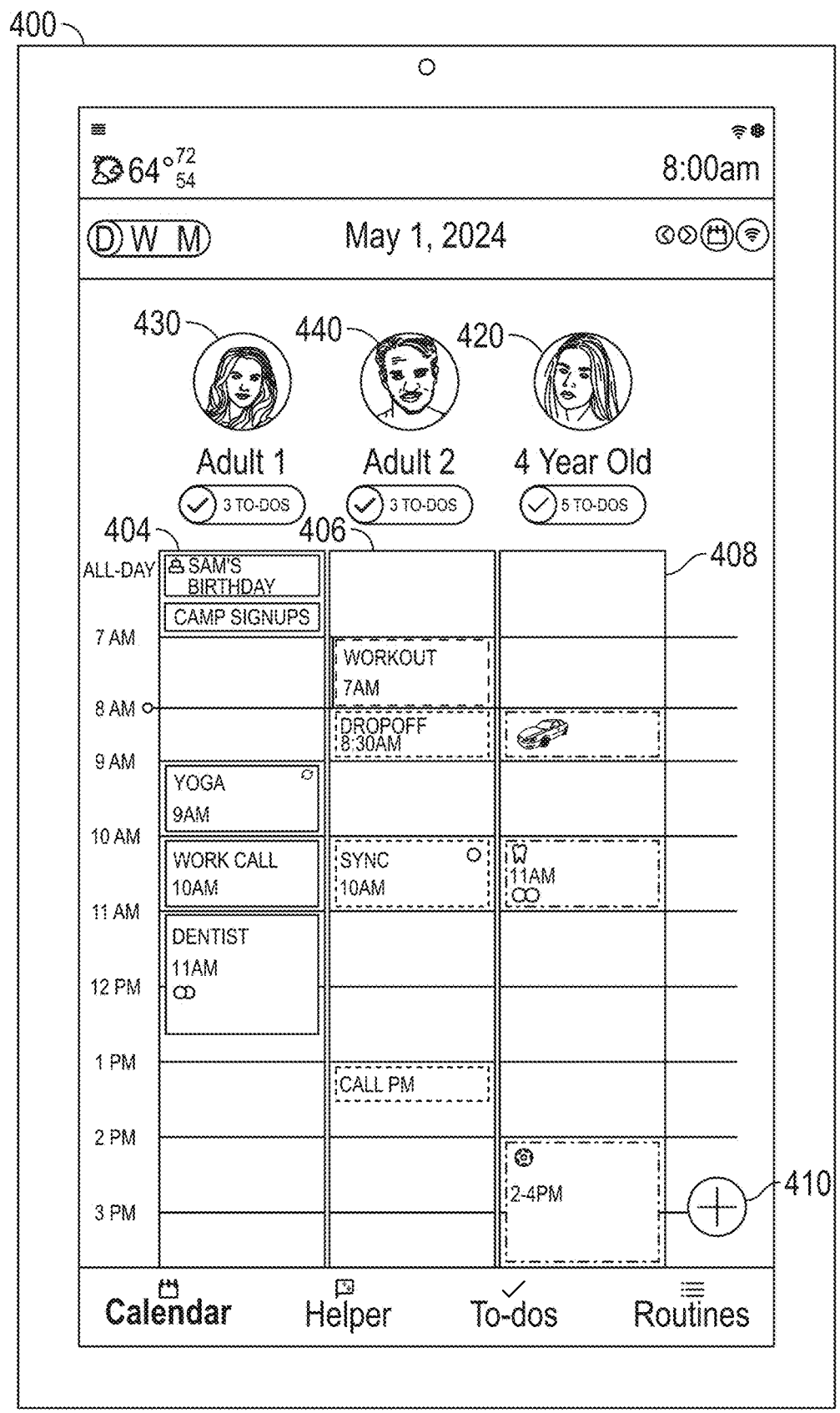
FIG. 4 illustrates a GUI displaying a shared calendar including tasks assigned to a plurality of users, in accordance with some examples.

FIG. 3 illustrates an exemplary GUI 300 that may be associated with a second user 320 (e.g., user 105 of Group 1), labeled "9 year old" in the figure. GUI 300 may be displayed on a touch screen display of the shared organization devices described herein (e.g., shared organization device 102). GUI 300 may be displayed on the same device as GUI 200 and may be activated when a different user (e.g., the second user) is using the device. As shown in FIG. 3, the GUI 300 depicts a routine for the second user 320 accessible by selecting the routines affordance 310. The routines affordance 310 may cause the device to display GUI 300 including the second user 320's routine when the second user 320 is logged into the device (e.g., identified as the user using the device, as described throughout), when user 320 activates a routine which activates the stored layout for the routine, or upon another triggering input received by the device. The layout of affordances, objects, information, etc. included in GUI 300 may be adapted to characteristics (e.g., physical and cognitive abilities of the second user). GUI 300 may include one or more interactive objects 304a, 304b associated with one or more tasks assigned to the second user 320 based on task data stored in a user profile of the user 320. Object 304a is a symbolic icon (a book) representing a task assigned to the user. Object 304b provides a textual description of the task ("homework"). The second user 320 may be provided with textual descriptions based on a more advanced cognitive ability of the second user (e.g., a more advanced reading ability).

One or more interactive affordances may be associated with the respective tasks represented by the one or more objects. Interactive affordance 306b may indicate an incomplete status of an "empty trash" task. Interactive affordance 306a may indicate a complete status of the homework task. As shown, interactive affordance 306b is of a first shape and size, and interactive affordance 306a is of a second shape and size. In some examples, a user's selection of an interactive affordance (e.g., 306b) associated with a particular task may result in updating a status of the task associated with the interactive affordance and displaying an updated interactive affordance (e.g., 306a) based on the updated status of the task. For example, after selecting an interactive affordance associated with a particular task, the task's status may be updated to be considered complete. It should be understood that updating the affordance to indicate the updated status of the task could be accomplished in any number of ways, for instance, by changing the affordance to state "complete," by changing the affordance to a different color, by removing the affordance from the GUI, etc.

In some examples, the GUI 300 may include a progress bar 302 configured to update based on a user input associated with a completion of at least one of the one or more tasks included in their routine. For example, a progress bar 302 may be displayed in the GUI 300 with a first portion of the progress bar being colored differently than the remainder of the bar. When a user interacts with interactive affordance 306*b*, the progress bar may be updated in the GUI such that the progress bar "progresses" from the left to the right, indicating completion of a task. As shown in FIG. 3, the progress bar 302 depicted on the second use 320's interface 300 may not include any symbolic representations. This may be due to a user-associated display setting based on the second user 320's more advanced cognitive ability (e.g., the second user can look at the completed tasks in their routine on the lower portion of the screen and understand why the progress bar has progressed to the current position, while the symbols may help the first user 220 to remember because their interface does not display their entire routine on a single page of the display. However, the progress bar 302 still provides the user 320 with an indication of how many tasks they have completed and/or how many more they still need to complete.

The GUIs 200 and 300 above depict routines for a single user. FIG. 4 illustrates a shared calendar GUI 400 that depicts a shared calendar for a plurality of users included in a group associated with one of the shared organization devices described herein (e.g., shared organization device 102). GUI 400 displays a plurality of tasks associated with user 430, user 440, and user 420. Tasks 404 are associated with user 430. Tasks 406 are associated with user 440. Tasks 408 are associated with user 440. One or more of the tasks included in tasks 404, 406, and/or 408 may be associated with more than one of the users 430, 440, and 420. For instance, user 430 and user 420 both have the same dentist appointment task from 11:00 am to 12:30 pm on the shared calendar. The tasks may be displayed for the individual users on the shared calendar according to display settings for each of the users. For instance, users 440 and 430 may be adults, and thus may have more advanced cognitive and/or physical abilities than user 420, who may be a young child. Descriptions of tasks 404 associated with user 430 and tasks 406 associated with user 440 may be displayed using text based on more advanced user-associated display settings for users 430 and 440 (e.g., due to relatively more advanced reading abilities for those users). Descriptions of the tasks 408 associated with user 420 may be displayed using symbolic representations (e.g., a car representing the dropoff task included on both user 440 and user 420's task list, a tooth for the dentist appointment, or a soccer ball for soccer practice).

GUI 400 may enable any of users 430, 440, and 420 to add tasks to their respective portion of the shared calendar, for instance, by selecting affordance 410. Upon selection of affordance 410, GUI 400 may display an additional window or prompt requesting information about a task to be added to the shared calendar. GUI 400 may prompt the user for a user to assign the task to, a date and/or time associated with the task, and/or a description of the task. In some examples, in addition to, or in place of prompting the user for the user to assign the task to, the device may identify the user interacting with the device. For instance, the user may have previously logged into the device with a username/password or other identifier. The device may additionally, or alternatively, automatically identify the user based on biometric data using a sensor of the shared organization device. The device may then automatically associate the added task with that user. The device may adapt various aspects of GUI 400, such as locations of affordances, the manner of conveying information (e.g., text vs. symbol), and so on, based on the user-associated display settings for the identified user, as described throughout the disclosure, including displaying the added task on the calendar in the portion of the calendar associated with the user assigned to the task according to that user's user-associated display settings.

In some examples, user interactions received via GUI 200 and/or GUI 300 may result in updates to the information displayed on GUI 400. For instance, if a user marks a task on their routine as completed via GUI 200 or GUI 300, that user's portion of the calendar may be updated to display an indication of the completed task. While GUI 400 is depicted and explained with reference to three different users, it should be understood that any number of users may be included in a group associated with the device and thus any number of users may have tasks displayed on the shared calendar of GUI 400. GUI 400 includes a first plurality of tasks 404 associated with user 430.

One or more components of system 100 may be used to perform a method for optimizing a GUI based on characteristics of different users. The GUI may be optimized for one or more individual users included in a group of users that is associated with the shared organization device. The shared organization device 102 of system 100 may identify the particular user interacting with the device based on a detected user input (e.g., username, biometrics, etc.) and determine user associated display settings for the user. The user associated display settings may be determined based on one or more characteristics of the user, including a physical ability and/or a cognitive ability of the user. The device may configure and display a GUI according to the user's user associated display settings such that the GUI is tailored to a user's respective cognitive ability and/or physical ability, for instance, by one or more arranging interactive affordances at a predefined location (e.g., a lower portion or higher portion of the GUI) based on a height of the user.

FIG. 5 illustrates an exemplary method 500 for optimizing a GUI for individual users included in a group of users associated with a shared wall mountable device based on user associated display settings. One or more steps of the method 500 may be carried out by a computing system such as system 100 described with reference to FIG. 1. Method 500 is performed, for example, using one or more electronic devices implementing a software platform. In some examples, method 500 is performed using a client-server system, and the blocks of method 500 are divided up in any manner between the server and one or more client devices. Thus, method 500 is not limited to any particular devices. In method 500, some blocks are, optionally, combined, the order of some blocks is, optionally, changed, and some blocks are, optionally, omitted. In some examples, additional steps may be performed in combination with the method 500. Accordingly, the operations as illustrated (and described in greater detail below) are exemplary by nature and, as such, should not be viewed as limiting.

At block 502, the method may include identifying a first user of the plurality of users associated with the shared organization device that is interacting with the shared organization device based on a first user input. The user may be identified based on an input received by the shared organization device. In some examples, a user may execute an input by interacting with one or more GUI interactive affordances (e.g., text fields, drop-down menus, checkboxes, selectable and/or deselectable buttons/icons) displayed on the shared organization device. For example, the user may input a username and password, email, name, or other identifier via a GUI of the shared organization device. In some examples, the input may include biometric data (e.g., facial image data, fingerprint data, voice data, retinal scans) detected using a sensor of the shared organization device. The shared organization device may process the data to determine an identifier of the user. For instance, the input may be received via an audio sensor device included in shared organization device. The device may process to audio input to match it to a voice signature associated with a user to identify the user. The input may include image data captured using a camera of the shared organization device. The device may process the image data (e.g., using facial recognition software) to identify a user based on the image data. The input may include a fingerprint scan, and the device may process the data obtained by the scanner to identify the user (e.g., by matching the fingerprint data to a fingerprint stored in association with a user within a database of the device). In some examples, identifying a user based on user input may include querying a database to compare an input received from the user to an identifier stored in the database. In some examples, one or more databases may be stored in a memory of a shared organization device. For instance, shared organization device 102 may include database 102*b*. In some examples, one or more databases 107*b* may be stored remotely at server 107 (e.g., on the cloud). shared organization device.

At block 504, the method may include determining one or more user-associated display settings for the first user. Determining the one or more user-associated display settings for the first user may include determining information that is relevant to the first user (e.g., tasks, routines, schedules, etc.), which may be displayed to the first user as described further below. One or more of the user-associated display settings for the first user may be determined based on a physical ability and a cognitive ability of the first user. The physical ability of a user may be associated with one or more physical ability characteristics of a user such as an age of the user, a height of the user, an eyesight status of the user (e.g., blindness), a hearing ability of the user (e.g., deafness), a mobility status of the user, etc. In some examples, an age of the user, a height of the user, an eyesight status of the user (e.g., blindness), a hearing ability of the user (e.g., deafness), a mobility status of the user, etc. may be stored in association with the user's identifier within the database (e.g., in a user profile). The device may identify the user, query the database using the identifier, and determine characteristics of the user (such as age, height, etc.) stored in the user's profile.

In some examples, the device may store settings associated with one or more characteristics indicative of or associated with different physical abilities. For instance, users within a certain age range may be associated with certain gesture abilities, and thus, the physical ability to interact with certain types of affordances. The device may store settings that cause display of relatively more simplistic interactive affordances for relatively younger users and relatively more advanced affordances for relatively older users. A user's height may be associated with an ability to reach different portions of the display, and thus, the device may store settings that cause display of affordances and information at different vertical locations of the device based on a user's height. A user's eyesight may be indicative of a user's ability to interact with certain visual elements of the display. The device may store settings that enable certain audio functionality to direct/support a user's engagement with affordances and information displayed on the GUI based on a user's eyesight status (e.g., blindness). A user's hearing may be indicative of a user's ability to interact with different audio aspects of the device. The device may store settings that enable certain visual settings to supplement audio features of the device based on a hearing status (e.g., deafness) of a user.

The cognitive ability of the user may be associated with one or more characteristics of a user such as age, literacy or cognitive processing level, mental disability status, etc. In some examples, one or more characteristics of the user associated with the user's cognitive abilities may be stored in association with the user's identifier within the database (e.g., in a user profile). The device may identify the user, query the database using the identifier, and determine characteristics of the user indicative of or associated with various cognitive abilities. The device may store settings that cause the device to display certain affordances and/or information and/or otherwise activate/deactivate different functionalities based on the characteristics of the user indicative of or associated with different cognitive abilities. For instance, users within a certain age range, certain literacy or cognitive processing levels, and/or certain mental disability status may be associated with different reading abilities, and thus, may differ in their ability to read and interact with certain types of information and/or affordances on the GUI. The device may store settings that cause display of relatively more simplistic information and/or affordances and/or relatively more advanced affordances and/or information based on a user's age and/or literacy or cognitive processing level. For instance, the device may store settings that translate text into symbolic icons for relatively younger and/or less literate users. The device may display text in place of symbolic icons for older, more educated, and/or more literate users.

In some examples, a device (e.g., shared organization device 102) performing method 500 may determine cognitive and/or physical abilities of a user based on detected information about the user in real time as a user interacts with the device. For instance, the device may have a forward-facing camera configured to capture image data of the user interacting with the device. The device may be configured to algorithmically (e.g., using machine learning or other computer vision models), determine an age of a user, a height of a user, a gesture ability of a user, etc. based on image/video data of the user detected by the camera of the device. The device may compare the age, height, etc. determined based on the image/video data to physical abilities and/or cognitive abilities stored in association with the determined age, height, etc. in a database of the device. For instance, the certain ages may be associated with certain reading abilities, and certain heights may be associated with an ability to reach different locations on the display of the device. The device may store settings (e.g., program code) in association with those differing cognitive and/or physical abilities. As described further below, the device may configure a GUI according to those physical and/or cognitive abilities. For instance, the device may store settings that cause the GUI to display affordances relatively lower on the screen for users determined to be in a relatively shorter height range than relatively taller users.

At block 506, the method may include displaying an interactive user interface of the shared organization device based on the one or more user-associated display settings for the first user. Displaying the interactive interface may include displaying one or more interactive affordances at a first location of the touch screen display based on the physical ability of the first user and displaying one or more symbolic representations of one or more tasks assigned to the first user based on the cognitive ability of the first user.

For example, the first user may be under a certain height threshold and/or under a certain age threshold. Accordingly, one or more affordances and/or information may be displayed at a location of the device optimized for relatively younger and/or relatively shorter users. For instance, one or more affordances and/or information may be displayed relatively lower on the device (e.g., compared to a second user, as described below). The first user may also be under a certain literacy or cognitive processing threshold (and/or under another certain age threshold) associated with a lower reading ability than relatively older or more educated users. Accordingly, the device may display one or more symbolic representations of information in place of text. For instance, the display may include one or more tasks assigned to the first user. The tasks may be represented symbolically (e.g., a tooth may represent a teeth brushing task, a book may represent a homework task, etc.). In some examples, any of the interactive affordances may include text fields, drop-down menus, check-boxes, and/or selectable buttons/icons. The interactive affordances may be associated with one or more tasks assigned to a user based on task data stored in a user profile of the user.

At block 508, the method may include identifying a second user of the plurality of users associated with the shared organization device that is interacting with the shared organization device based on a second user input. The second user may be identified according to any of the methods described above with respect to block 502.

At block 510, the method may include determining one or more user-associated display settings for the second user. Determining the one or more user-associated display settings for the first user may include determining information that is relevant to the second user (e.g., tasks, routines, schedules, etc.), which may be displayed to the second user as described further below. One or more of the user-associated display settings for the second user may be determined based on a physical ability and a cognitive ability of the second user. Determining one or more user-associated display settings for the second user based on a physical ability and a cognitive ability may include any of the steps described above with reference to block 504. The second user may have different physical and/or cognitive abilities than the first user. The second user may be of a different age, height, mobility status, eyesight status, and/or hearing status, etc. than the first user. The second user may be of a different literacy level and/or mental disability status, etc. than the first user. Accordingly, the device may determine one or more different user-associated display settings for the second user may be different than those for the first user. The device may adapt the GUI such that it is optimized for the second user.

At block 512, the method may include displaying an interactive user interface of the shared organization device based on the one or more user-associated display settings for the second user. Displaying the interactive user interface may include displaying one or more interactive affordances at a second location of the touch screen display based on the physical ability of the second user and displaying one or more textual representations of one or more tasks assigned to the second user based on the cognitive ability of the second user. For instance, the second user may be older and/or taller than the first user and so the device may display interactive affordances at a higher vertical location of the screen than for the first user. The second user may additionally, or alternatively, have a more developed gesture ability and/or touch literacy than the first user, and so the device may display relatively more interactive affordances than are displayed to the first user. The device may display more complex affordances than are displayed to the first user (e.g., text boxes as opposed to check-box affordances), etc. The interactive affordances may be associated with one or more tasks assigned to a user based on task data stored in a user profile of the user.

The shared organization devices described herein may track and analyze activity data based on user inputs. The devices may also configure shared user interfaces such as shared calendars that depict tasks, schedules, etc. assigned to a plurality of different users. The shared interfaces may be updated based on user interactions received through the interfaces adapted to user-associated display settings described above. FIG. 3 illustrates a method 300 that may be a continuation of the method 500 for tracking and analyzing activity data based on user inputs, and for configuring shared user interfaces, such as shared calendars that depict tasks, schedules, etc., assigned to a plurality of different users. Although the method 300 is described with reference to a first user and a second user, it should be understood that the method may include similar steps corresponding to any number of users.

At block 602, the method may include receiving activity data associated with the first user (e.g., user 220 of FIG. 2) based on a selection of an interactive affordance of the one or more interactive affordances by the first user. The activity data may include a completed status for a task assigned to the user, a date and time of completion of the task, and an indication of the user of the group that completed the task. For example, as shown in FIG. 2, user 220 may select interactive affordance 206 on GUI 200 indicating completion (or any other updated status) of the task 204 assigned to user 220. As described below, upon selection of affordance 206 associated with task 204 assigned to the user 220, the device may update the GUI to indicate task 204 is completed. Thus, the device enables users to interact with and track completion of tasks in their routine using an interactive GUI (e.g., GUI 200).

At block 604, the method may include updating a database associated with the shared organization device based on the activity data associated with the first user (e.g., user 220 of FIG. 2), comprising updating a status of a task associated with the selected interactive affordance. Updating the database may include associating the completed task(s) with the user that completed the task. For instance, a device performing method 600 (e.g., shared organization device 102) may write the activity data to a user profile for the user that selected the interactive affordance at block 602 (e.g., to indicate that the user has completed a task or tasks included in their routine). The database may include any of the features described above with reference to FIG. 1. The database may be stored locally in the shared device or remotely, such as in a cloud environment. The database may be accessed through memory in the shared device or remotely through a server.

The database may store a user profile for each of the users in the group (e.g., including user 220). Each user profile may include data associated with one or more tasks assigned to and/or completed by the corresponding user. Each user profile may include data associated with historical user behavioral trends, such as historical user completion rates of each task, historical user latency times for each task, and/or historical user improvement rates of task completion and/or latency times. In some examples, each user profile includes personal information that describes the corresponding user. For example, each user profile may include a user's age, height, disability status, literacy, language fluency, literacy or cognitive processing level, blindness or other visual impairment, deafness or other auditory impairment, and or mobility status. The database may store a group profile for the group associated with the shared device (e.g., Group 1 depicted in FIG. 1). The group profile may include data associated with any or all tasks completed by any user in the group. The group profile may include data associated with any or all tasks assigned to the group or any user in the group. The group profile may include data associated with historical group behavioral trends, such as historical group completion rates of each task, historical group latency times for each task, historical group improvement rates of task completion and/or latency times, etc.

At block 606, the method may include updating the interactive user interface to display an interactive affordance indicating the updated status of the task. For instance, affordance 204 labeled "done" in FIG. 2 may be updated to display a check mark indicating completion of the task. It should be understood that the GUI may be updated in any other manner to indicate the updated status of the task.

At block 608, the method may include receiving activity data associated with the second user based on a selection of an interactive affordance of the one or more interactive affordances by the second user (e.g., user 320 of FIG. 3.). The activity data may include a completed status for a task assigned to the user, a date and time of completion of the task, and an indication of the user of the group that completed the task. For example, as shown in FIG. 3, user 320 may select interactive affordance 306b on GUI 300 indicating completion (or any other updated status) of an empty trash task assigned to user 320. As described below, upon selection of affordance 306b associated with the task assigned to the user 320, the device may update the GUI to indicate the task is completed.

At block 610, the method may include updating the database associated with the shared organization device based on the activity data associated with the second user, comprising updating a status of a task associated with the selected interactive affordance. Updating the database may include associating the completed task(s) with the user that completed the task and may include any of the features described with reference to block 604 above. The user profiles may also include demographic information and/or other information associated with the respective users (e.g., name, age, height, mobility status, etc.).

At block 612, the method may include updating the interactive user interface to display an interactive affordance indicating the updated status of the task. Updating the interactive user interface to display an interactive affordance indicating the updated status of the task may include updating/replacing an interactive affordance with one of a different shape, color, or other appearance to indicate an updated status of the task associated with the affordance. For instance, referring to GUI 300 of FIG. 3, when a user selects affordance 306b to update the status of the empty trash task, the interactive user interface may update to replace affordance 306b with an affordance similar to affordance 306a to indicate the empty trash task is completed.

At block 614, the method may include determining at least one behavioral insight associated with the first user and/or the second user based on the updated database, comprising comparing the activity data associated with the first user and/or the second user to activity data associated with at least one other user of the plurality of users. Determining the at least one behavioral insight may include comparing activity data associated with the first user to activity data associated with the second user (e.g., and/or comparing activity data associated with any number of users in a group associated with the shared organization devices described herein and/or comparing activity data between groups). It should be understood that while described with reference to the first user and/or the second user, behavioral insights may be generated based on information associated with any number of users and/or groups of users. For instance, behavioral insights may be generated based on data associated with any or all members in a group associated with a shared organization devices or based on data associated with a plurality of groups associated with a plurality of shared organization devices. Data used to generate behavioral insights may be stored in any one or more of local databases of the shared organization devices, databases stored at servers, on the cloud etc. The databased may include data associated with any number of groups associated with any number of devices.

As described throughout, the shared organization devices may be associated with groups of users. As an example, a shared organization device performing the method 600 may include the first and second user described above. It may also include any number of other users. The at least one behavioral insight may be associated with the first user based on the received activity data associated with the first user, the second user based on the received activity data associated with the second user, or any other user(s) included in the group based on their activity data. The at least one behavioral insight may include a most productive user between the first and second user, a most efficient user between the first and second user, and/or any of the exemplary insights described below.

The at least one behavioral insight may include a least productive user included in the group of users associated with the shared device. The least productive user may be determined based on a number of tasks completed by the user relative to others in the group associated with the device, a latency between task assignment and completion by the user relative to others in the group associated with the device, or any combination thereof. The at least one behavioral insight may include a most productive user included in the group of users associated with the shared device. The most productive user may be determined based on a number of tasks completed by the user relative to others in the group associated with the device, a latency between task assignment and completion by the user relative to others in the group associated with the device, or any combination thereof. The device may determine the most productive and/or least productive users with respect to one or more particular tasks of a plurality of tasks. The device may determine the most productive and/or least productive users with respect to a subset of all of the tasks assigned to the group and individuals therein associate with the device. The device may determine the most productive and/or least productive users with respect to all of the tasks assigned to the group and individuals therein associate with the device.

The at least one behavioral insight may include one or more users that are relatively better suited for particular tasks than other users (e.g., based on productivity metrics determined for the user(s) based on historical task-completion data, characteristics of the users stored in the database associated with the device, or any combination thereof. For instance, the device may determine that a first user is better (e.g., more efficient, more experienced, of suitable age, of suitable mobility status, etc.) than the remaining users in a respective group associated with the device at a first task (e.g., taking out the trash) while a second user is better (e.g., more efficient, more experienced, of suitable age, of suitable mobility status, etc.) than the remaining users in the group at a second task (e.g., vacuuming).

The at least one behavioral insight may include a total number of times one or more tasks of the plurality of tasks were completed. For instance, the at least one behavioral insight may include a total number of times one or more tasks of the plurality of tasks were completed by a particular user and/or users in the group associated with the device. The at least one behavioral insight may include a frequency at which one or more tasks of the plurality of tasks were completed. For instance, the device may determine how often a particular user or the group associated with the device completes the task within a respective time window (e.g., per day, per week, per month, per year).

The at least one behavioral insight may include a latency between an assignment and a completion of one or more tasks of the plurality of tasks. The at least one behavioral insight may include one or more particular tasks that have a relatively greater latency (or relatively lower latency) between an assignment and a completion of the respective task compared to other tasks assigned to the group associated with the device or individuals included in the group. The at least one behavioral insight may include a task that has the greatest (or lowest) average latency between an assignment and a completion of the task for a given time period (e.g., week, month, year).

The at least one behavioral insight may include a number of consecutive times one or more tasks of the plurality of tasks were performed by a particular user of one or more users included in the group of users. The at least one behavioral insight may include a number of consecutive times one or more tasks of the plurality of tasks were performed at a particular time (e.g., a time of day on different days, on a particular day of the week, etc.).

The at least one behavioral insight may include a most (and/or least) productive portion of a predefined time period (e.g., day of a week, week of the month, month of the year, etc.) for the group of users and/or individual users included in the group associated with the shared device. The most productive day may be determined based on a number of tasks completed based on the number of tasks completed by the group (and/or individuals therein) associated with the device on the respective day relative to other days in a given time period. Productivity may also be measured according to other metrics, such as latency between assignment and completion of a task.

The at least one behavioral insight may include a least busy portion of a predefined time period (e.g., day of a week, week of the month, month of the year, etc.) for the group of users associated with the shared device. The least busy portion may be determined based on a number of tasks assigned to that portion of the time period relative to others and/or a number of tasks completed in that portion of the time period relative to other portions.

The at least one behavioral insight may include an on-time completion metric of the plurality of tasks for the group of users associated with the shared device. The on-time completion metric may include any metric (e.g., a percentage, number, binary indication, etc.) indicative of a user's or group's completion of one or more assigned tasks within an assigned time period.

The at least one behavioral insight may include an optimal time for assignment of one or more tasks of the plurality of tasks. The optimal time for assignment of one or more tasks of the plurality of tasks may include an optimal day, week, month, year, etc. to assign a given task for completion (e.g., for a user or the group to complete the task), the optimal time of day for a user to complete a task, or any combination thereof.

At block 616, the method may include displaying the at least one behavioral insight. The behavioral insight may be displayed on the GUI of the shared organization device (e.g., GUI 102a of shared device 102 depicted in FIG. 1). Displaying the at least one behavioral insight may include displaying a graphical representation of the at least one behavioral insight. The graphical representation may include a leaderboard (e.g., comparing user productivity metrics). Displaying the behavioral insight(s) may enable users to view and recognize group and/or individual behaviors that may go unnoticed otherwise. It may also enable users to hold each other accountable and/or acknowledge positive behavior changes. Behavioral insights may be displayed using text, images/icons, percentages, and/or graphs.

At block 618, the method may include displaying an interactive shared calendar interface comprising a plurality of tasks associated with the first user and the second user based on the updated database. The shared calendar may include or share one or more features in common with GUI 400 shown in FIG. 4.

Figure 8:
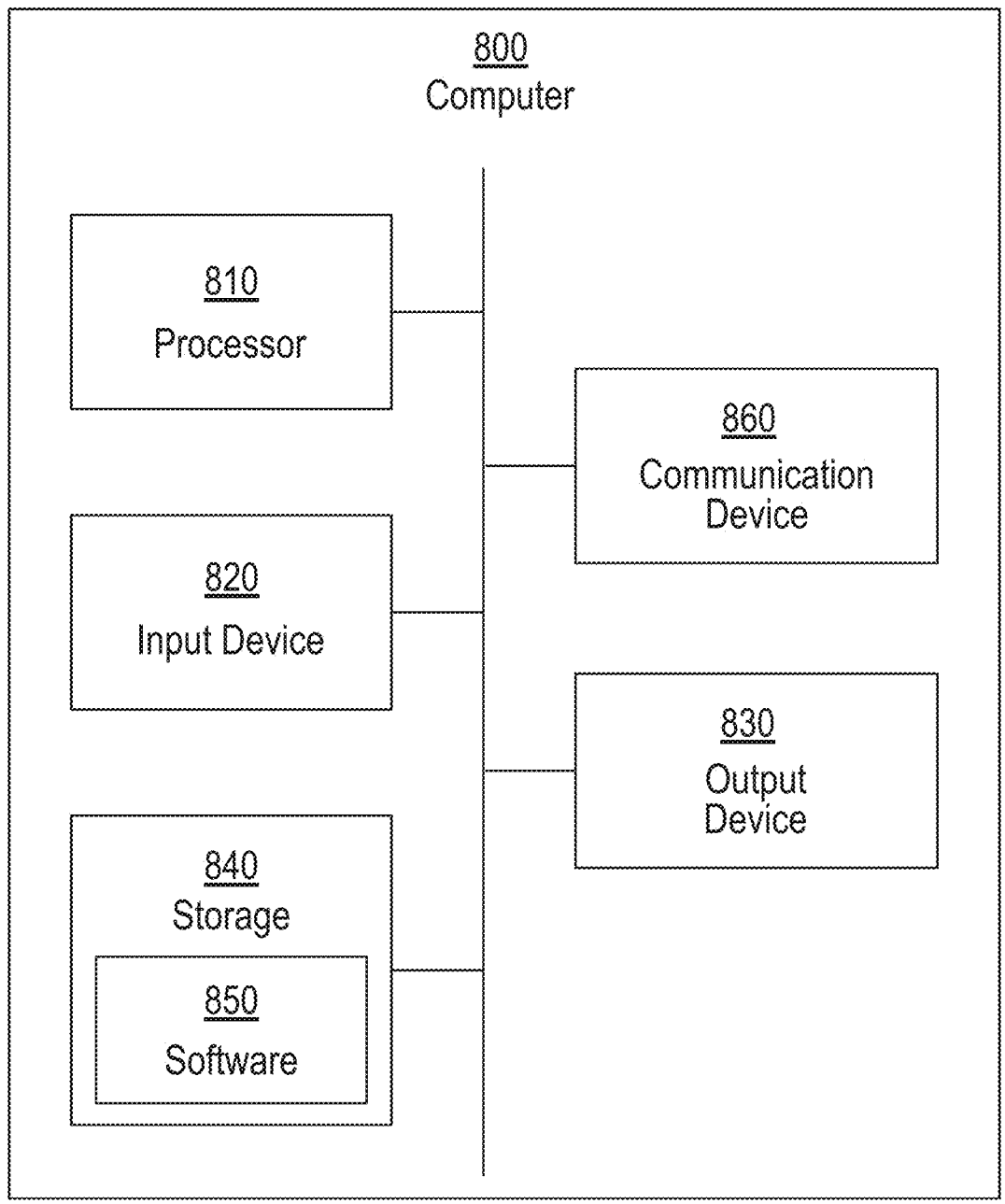
FIG. 8 illustrates an exemplary computing device, in accordance with some examples.

In one or more examples, the disclosed systems and methods utilize or may include a computer system. FIG. 8 illustrates an exemplary computing system according to one or more examples of the disclosure. Computer 800 can be a host computer connected to a network. Computer 800 can be a client computer or a server. As shown in FIG. 8, computer 800 can be any suitable type of microprocessor-based device, such as a personal computer, workstation, server, or handheld computing device, such as a phone or tablet. The computer can include, for example, one or more of processor 810, input device 820, output device 830, storage 840, and communication device 860. Input device 820 and output device 830 can correspond to those described above and can either be connectable or integrated with the computer.

Input device 820 can be any suitable device that provides input, such as a touch screen or monitor, keyboard, mouse, or voice-recognition device. Output device 830 can be any suitable device that provides an output, such as a touch screen, monitor, printer, disk drive, or speaker.

Storage 840 can be any suitable device that provides storage, such as an electrical, magnetic, or optical memory, including a random-access memory (RAM), cache, hard drive, CD-ROM drive, tape drive, or removable storage disk. Communication device 860 can include any suitable device capable of transmitting and receiving signals over a network, such as a network interface chip or card. The components of the computer can be connected in any suitable manner, such as via a physical bus or wirelessly. Storage 840 can be a non-transitory computer-readable storage medium comprising one or more programs, which, when executed by one or more processors, such as processor 810, cause the one or more processors to execute methods described herein.

Software 850, which can be stored in storage 840 and executed by processor 810, can include, for example, the programming that embodies the functionality of the present disclosure (e.g., as embodied in the systems, computers, servers, and/or devices as described above). In one or more examples, software 850 can include a combination of servers such as application servers and database servers.

Software 850 can also be stored and/or transported within any computer-readable storage medium for use by or in connection with an instruction execution system, apparatus, or device, such as those detailed above, that can fetch and execute instructions associated with the software from the instruction execution system, apparatus, or device. In the context of this disclosure, a computer-readable storage medium can be any medium, such as storage 540, that can contain or store programming for use by or in connection with an instruction execution system, apparatus, or device.

Software 850 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific examples. The illustrative examples described above, however, are not intended to be exhaustive or to limit the disclosure to the precise forms disclosed. Many modifications and variations are possible in view of the above teachings. The embodiments were chosen and described to best explain the principals of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method for adapting a shared organization device for different users of a plurality of users, the method comprising:
    identifying a first user of the plurality of users associated with the shared organization device that is interacting with the shared organization device based on a first user input;
    determining one or more user-associated display settings for the first user based on a physical ability and a cognitive ability of the first user;
    displaying an interactive user interface of the shared organization device based on the one or more user-associated display settings for the first user, comprising:
        displaying one or more interactive affordances at a first location of the touch screen display based on the physical ability of the first user, and
        displaying one or more symbolic representations of one or more tasks assigned to the first user based on the cognitive ability of the first user;
    identifying a second user of the plurality of users associated with the shared organization device that is interacting with the shared organization device based on a second user input;
    determining one or more user-associated display settings for the second user based on a physical ability and a cognitive ability of the second user;
    displaying an interactive user interface of the shared organization device based on the one or more user-associated display settings for the second user, comprising:
        displaying one or more interactive affordances at a second location of the touch screen display based on the physical ability of the second user, and
        displaying one or more textual representations of one or more tasks assigned to the second user based on the cognitive ability of the second user.

2. The method of claim 1, comprising:
    receiving activity data associated with the first user based on a selection of an interactive affordance of the one or more interactive affordances by the first user;
    updating a database associated with the shared organization device based on the activity data associated with the first user, comprising updating a status of a task associated with the selected interactive affordance; and
    updating the interactive user interface to display an interactive affordance indicating the updated status of the task.

3. The method of claim 2, comprising:
    receiving activity data associated with the second user based on a selection of an interactive affordance of the one or more interactive affordances by the second user;
    updating the database associated with the shared organization device based on the activity data associated with the second user, comprising updating a status of a task associated with the selected interactive affordance; and
    updating the interactive user interface to display an interactive affordance indicating the updated status of the task.

4. The method of claim 3, comprising: determining at least one behavioral insight associated with the first user based on the updated database, comprising comparing the activity data associated with the first user users to activity data associated with at least one other user of the plurality of users.

5. The method of claim 4, comprising displaying the at least one behavioral insight.

6. The method of claim 3, comprising: displaying an interactive shared calendar interface comprising a plurality of tasks associated with the first user and the second user based on the updated database.

7. The method of claim 4, wherein updating the interactive user interface comprises updating a progress bar displayed on the interactive interface based on the updated status of the task.

8. The method of claim 1, wherein:
the physical ability of the first user is determined based on a physical characteristic of the first user detected using a camera of the shared organization device, and
wherein the physical ability of the second user is determined based on a physical characteristic of the second user detected using a camera of the shared organization device.

9. The method of claim 1, wherein:
the cognitive ability of the first user is determined based on an age of the first user stored in a database associated with the shared organization device, and
the cognitive ability of the second user is determined based on an age of the second user stored in a database associated with the shared organization device.

10. The method of claim 1, wherein displaying the interactive user interface of the shared organization device based on the one or more user-associated display settings for the first user comprises displaying one or more simplified interactive affordances based on the physical ability of the first user; and
wherein displaying the interactive user interface of the shared organization device based on the one or more user-associated display settings for the second user comprises displaying one or more advanced interactive affordances based on the physical ability of the second user.

11. The method of claim 1, wherein:
the first user input comprises an identifier associated with the first user received via the interactive interface of the shared organization device, and
wherein the second user input comprises an identifier associated with the second user received via the interactive interface of the shared organization device.

12. The method of claim 1, wherein first user input comprises biometric data associated with the first user detected using a sensor of the shared organization device, and wherein the second user input comprises biometric data associated with the second user detected using the sensor of the shared organization device.

13. The method of claim 1, wherein determining the one or more user-associated display settings of the user comprises querying a database to determine the one or more user-associated display settings stored in association with the user.

14. The method of claim 13, wherein the database is stored in a memory of the device.

15. A shared organization device comprising:
a touch-screen display;
one or more processors; and
memory storing instructions that, when executed by the one or more processors, cause the shared organization device to:
identify a first user of the plurality of users associated with the shared organization device that is interacting with the shared organization device based on a first user input;
determine one or more user-associated display settings for the first user based on a physical ability and a cognitive ability of the first user;
display an interactive user interface of the shared organization device based on the one or more user-associated display settings for the first user, comprising:
displaying one or more interactive affordances at a first location of the touch screen display based on the physical ability of the first user, and
displaying one or more symbolic representations of one or more tasks assigned to the first user based on the cognitive ability of the first user;
identify a second user of the plurality of users associated with the shared organization device that is interacting with the shared organization device based on a second user input;
determine one or more user-associated display settings for the second user based on a physical ability and a cognitive ability of the second user;
display an interactive user interface of the shared organization device based on the one or more user-associated display settings for the second user, comprising:
displaying one or more interactive affordances at a second location of the touch screen display based on the physical ability of the second user, and
displaying one or more textual representations of one or more tasks assigned to the second user based on the cognitive ability of the second user.

16. The shared organization device of claim 15, wherein the shared organization device is configured to wirelessly communicate with a plurality of wireless devices.

17. The shared organization device of claim 15, wherein the shared organization device comprises at least one sensor configured to detect biometric data.

18. The shared organization device of claim 17, wherein the at least one sensor comprises a camera.

19. The shared organization device of claim 17, wherein the shared organization device is configured to identify the first user based on an input received via a sensor of the device.

20. The shared organization device of claim 15, wherein the shared organization device is configured to identify the first user based on an input received via the graphical user interface.

21. A system for adapting a shared organization device for different users of a plurality of users, the system comprising one or more processors; and memory storing instructions that, when executed by the one or more processors, cause the system to:
identify a first user of the plurality of users associated with the shared organization device that is interacting with the shared organization device based on a first user input;
determine one or more user-associated display settings for the first user based on a physical ability and a cognitive ability of the first user;
display an interactive user interface of the shared organization device based on the one or more user-associated display settings for the first user, comprising:
displaying one or more interactive affordances at a first location of the touch screen display based on the physical ability of the first user, and
displaying one or more symbolic representations of one or more tasks assigned to the first user based on the cognitive ability of the first user;

identify a second user of the plurality of users associated with the shared organization device that is interacting with the shared organization device based on a second user input;
determine one or more user-associated display settings for the second user based on a physical ability and a cognitive ability of the second user;
display an interactive user interface of the shared organization device based on the one or more user-associated display settings for the second user, comprising:
displaying one or more interactive affordances at a second location of the touch screen display based on the physical ability of the second user, and
displaying one or more textual representations of one or more tasks assigned to the second user based on the cognitive ability of the second user.

22. A non-transitory computer-readable storage medium storing instructions for adapting a shared organization device for different users of a plurality of users, wherein the instructions are executable by a system comprising one or more processors to cause the system to:
identify a first user of the plurality of users associated with the shared organization device that is interacting with the shared organization device based on a first user input;
determine one or more user-associated display settings for the first user based on a physical ability and a cognitive ability of the first user;
display an interactive user interface of the shared organization device based on the one or more user-associated display settings for the first user, comprising:
displaying one or more interactive affordances at a first location of the touch screen display based on the physical ability of the first user, and
displaying one or more symbolic representations of one or more tasks assigned to the first user based on the cognitive ability of the first user;
identify a second user of the plurality of users associated with the shared organization device that is interacting with the shared organization device based on a second user input;
determine one or more user-associated display settings for the second user based on a physical ability and a cognitive ability of the second user;
display an interactive user interface of the shared organization device based on the one or more user-associated display settings for the second user, comprising:
displaying one or more interactive affordances at a second location of the touch screen display based on the physical ability of the second user, and
displaying one or more textual representations of one or more tasks assigned to the second user based on the cognitive ability of the second user.

\* \* \* \* \*